Figure 1:
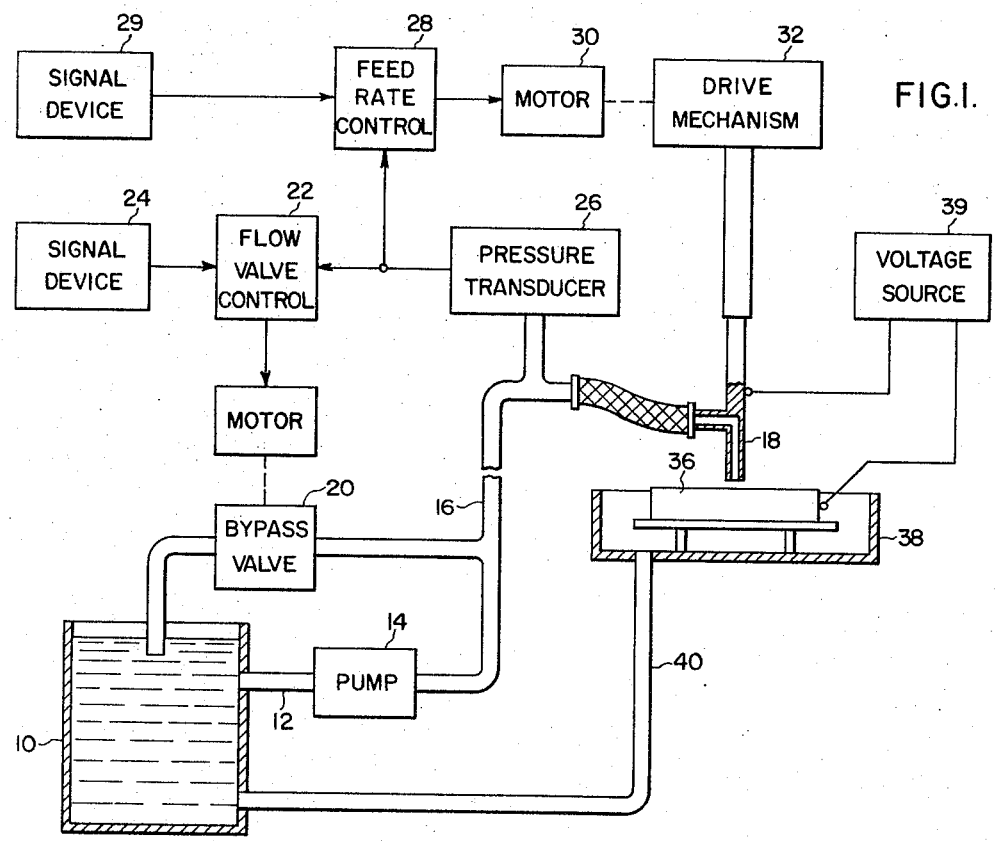

Jan. 23, 1968

R. E. FROMSON 3,365,381

ELECTROCHEMICAL MACHINING INCLUDING
IN-PROCESS GUAGING OF THE WORKPIECE

Filed Feb. 23, 1965

3 Sheets-Sheet 1

WITNESSES
Theodore F. Wrobel
James F. Young

INVENTOR
Robert E. Fromson
BY /W. Brodahl

ATTORNEY

United States Patent Office 3,365,381
Patented Jan. 23, 1968

3,365,381
ELECTROCHEMICAL MACHINING INCLUDING IN-PROCESS GUAGING OF THE WORKPIECE
Robert E. Fromson, Pittsburgh, Pa., assignor to Westinghouse Electric Corporation, Pittsburgh, Pa., a corporation of Pennsylvania
Filed Feb. 23, 1965, Ser. No. 434,581
10 Claims. (Cl. 204—143)

The present invention relates in general to electrolytic methods and apparatus for shaping and removing material from a workpiece, and more particularly to electrochemical machining of metal and electrically conductive workpieces.

It is known in the prior art to remove material from a workpiece by electrolytic techniques, where the workpiece is in effect the anode of an electrolytic cell. It is also known in the prior art to apply numerical control techniques to the more conventional mechanical cutting machine tools, where the respective drive motors are actuated in accordance with control signals supplied by magnetic tapes or the like and feedback speed and position sensing transducers provide comparison signals for determining and somewhat optimizing the sequence operations of the machine tool.

In general, the electrochemical machining process is essentially a deplating at relatively high current density. Because the electrolyte is a conductor in this process the concentration, cleanliness, and temperature of this electrolyte affect the deplating rate or effectiveness of the process. Prior art teachings show that it is required to control the conductivity of the electrolyte to a very high degree in order to obtain consistently accurate workpiece dimensional stability.

It is already known in the prior art that every material has one penetration rate for a given current density, such that it will then be deplatable at only one electrode feed speed for this current density regardless of the size of the area of the electrode. For example, when operating at 1000 amperes per square inch, which is determined by the feed rate because the orifice gap and hence current density varies with the feed rate, there is a theoretical equilibrium condition where the current density is 1000 amperes per square inch at a given electrolyte temperature, a particular voltage, and so forth, and a particular orifice gap. As the electrolyte heats up and its temperature rises, the feed rate should be increased to maintain the same current path resistivity to therefore maintain the same current over a constant orifice gap area. The prior art teachings provide a constant feed and as the electrolyte heats up, this results in a bigger cut hole in the workpiece because the current path resistivity has decreased and the orifice current density goes up and the process deplates quicker.

The electrolyte per se can present serious problems in that as a great deal of work cutting or removal is being done, the resulting heat input to the electrolyte due to the resistive power losses or drop in the electrolyte in the orifice gap causes heat transfer from these losses to the liquid raising the temperature of the electrolyte liquid. It is unwise to run the process with the electrolyte at a temperature close to that at which there results the formulation of gases or boiling within the orifice gap. The prior art teaches the provision of a heat exchanger in the system to take this heat out of the electrolyte to prevent the electrolyte getting above a certain temperature.

It is an object of the present invention to provide an improved workpiece machining method and apparatus for effecting a better removal of workpiece material by electrolytic means.

It is a different object of the present invention to provide an improved electrolytic method and apparatus, including a more adaptive control of same in relation to optimizing the operation, to effect a desired rate of removal of workpiece material at a lower unit cost and having better dimensional tolerances regarding the finished workpiece through the provision of a more constant effective orifice gap.

It is an additional object to provide a more simple and more effective method and apparatus for effecting and realizing a more repeatable and desired electrolytic machining or shaping of a workpiece.

It is a further object to better control the resulting shape and finish of electrochemically machined workpiece surfaces by means of an adaptive control operation.

In accordance with the present invention, an electrode operating in relation to a provided electrolyte fluid passage is advanced relative to a workpiece by mechanical means while the electrolyte fluid is passed through the fluid passage under a controlled pressure. The chosen shape of the electrically conductive portion of the electrode determines the resulting material removal and the resulting shape of the workpiece. An electric current is passed from the cathode electrode through the conductive electrolyte fluid to the anodic workpiece. A continuously operative adaptive feedback control of the electrochemical machining operation is provided by the present invention through the means of a closed loop system, which senses the actual orifice fluid pressure as a measure of the instantaneous gap or spacing between the workpiece and the electrode. It has been determined that a substantially linear relationship prevails between the orifice gap and the orifice fluid pressure. By comparing a predetermined reference or desired orifice pressure with the actual sensed orifice pressure, an error control signal is generated to drive one or more system variables, such as the electrode feed rate and the electrolyte fluid flow through the effective orifice gap. Thus, there is realized an in-process guaging or effective measurement of the workpiece as it is being cut or shaped, with attendant adaptive changing of the electrode feed parameter and the electrolyte flow parameter to maintain the desired orifice gap or spacing. In effect the electrode behaves like the plug of a conventional fluid guage and the gap behaves like the orifice. The present adaptive control system thereby provides closed feedback loop continuous monitoring to optimize the workpiece material removal.

Figure 4:
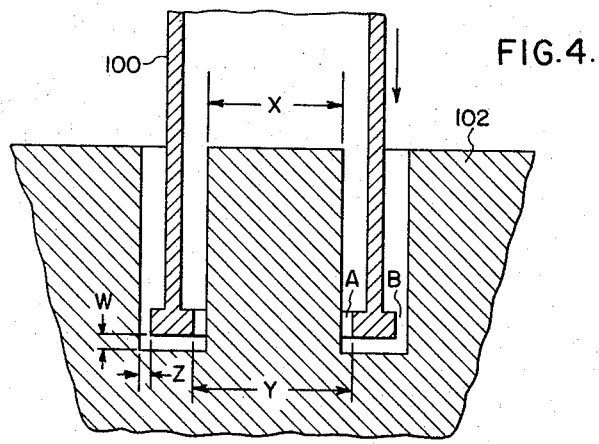
Figure 2:
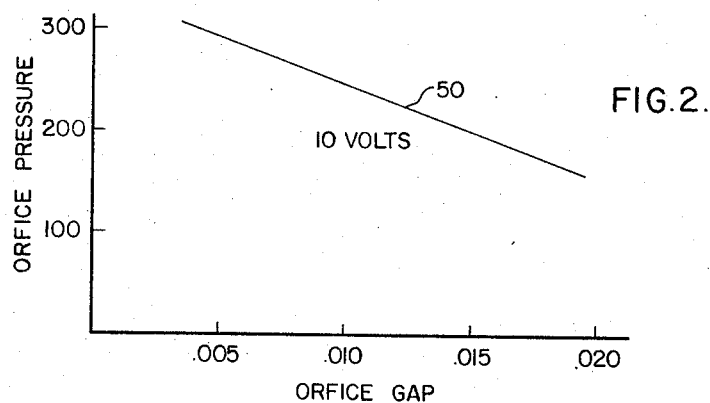
Figure 3:
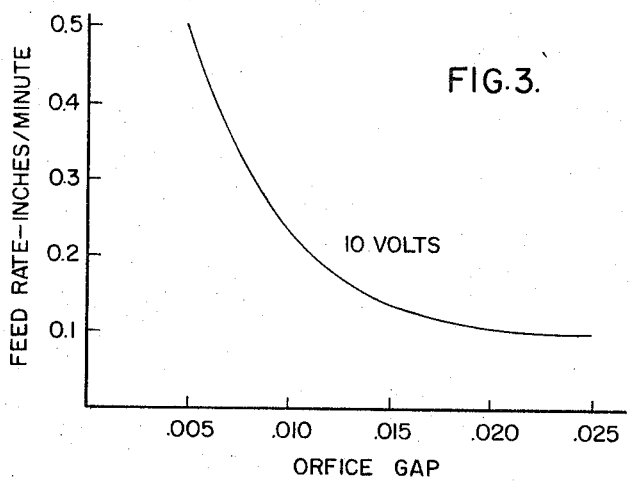
Figure 6:
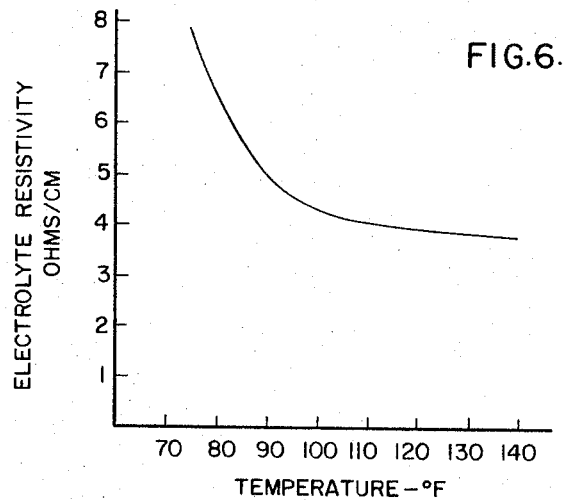
Figure 5:
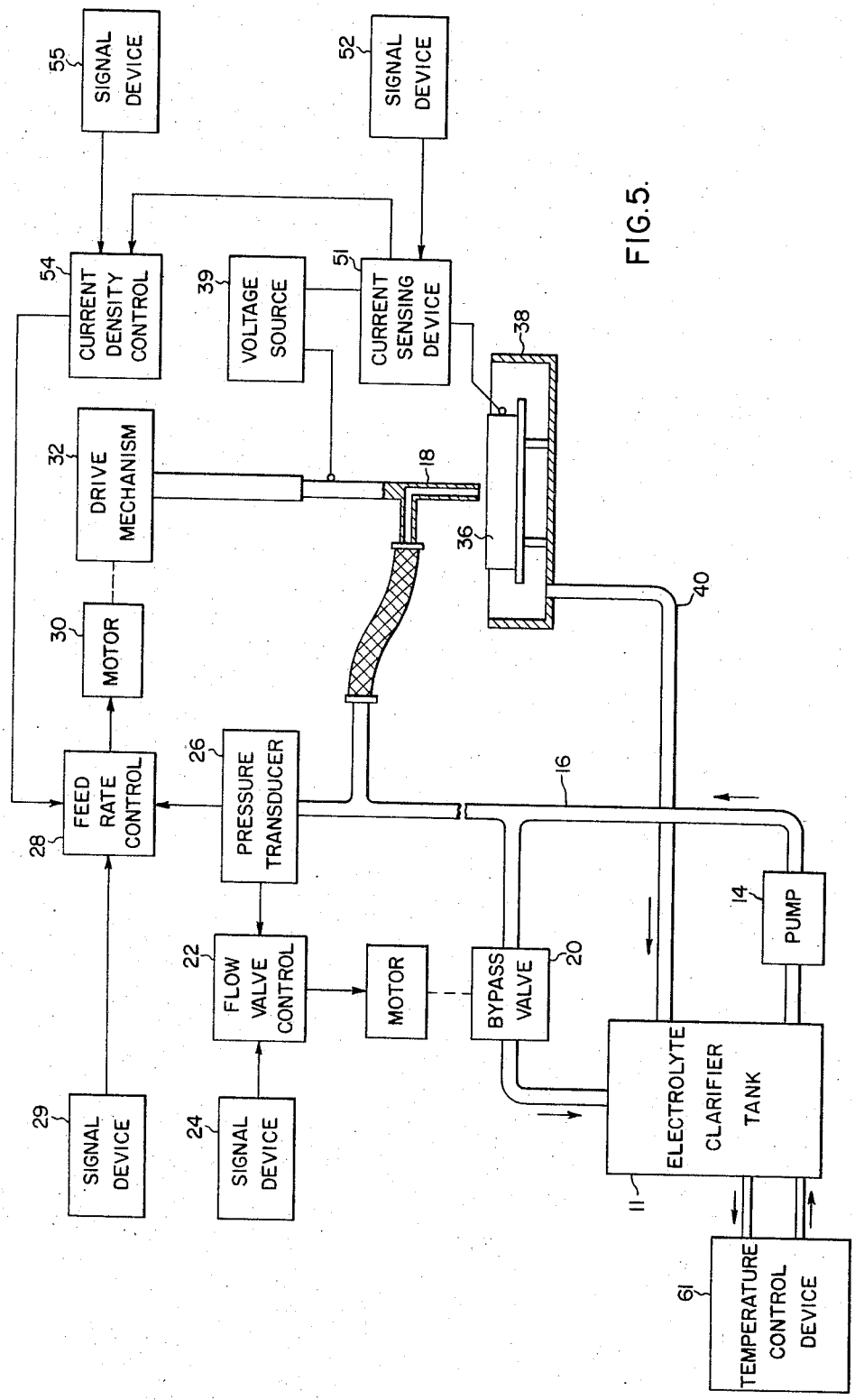

In FIGURE 1 of the drawing there is shown a diagrammatic representation of an electrolyte supply system and an electrode feed control system in accordance with the present invention;

In FIG. 2 there is shown a realized curve plot or orifice pressure as a function of orifice gap;

In FIG. 3 there is shown a realized curve plot of electrode feed rate as a function of orifice gap;

In FIG. 4 there is shown a typical electrode cut into a workpiece to illustrate the orifice gap;

In FIG. 5 there is shown a modification of the present invention;

In FIG. 6 there is shown a curve to illustrate the relationship between electrolyte resistivity and electrolyte temperature.

Referring to FIG. 1 of the drawing there is shown an electrolyte fluid container 10 connected by a conduit 12 to a fluid pump 14 which feeds a conduit 16 connected to an electrode 18 having a fluid passage therein. A typical electrolyte fluid for cutting a steel work-piece can be a salt solution of NaCl. A bypass valve 20 is connected to receive high pressure fluid from the conduit 16 and by pass it around the pump 14 back to the electrolyte fluid container 10. A flow valve control 22 is operative with a set point signal device 24 and an orifice fluid pressure sensing transducer 26 for controlling the operation of the bypass flow valve 20. A feed rate control 28 is operative with the set point signal device 29 and the orifice fluid pressure sensing transducer 26 for determining the operation of a feed motor 30 operative with a drive mechanism 32 connected to determine the feed movement of the electrode 18. Each of the controls 22 and 28 can include a bias potentiometer for fine trimming purposes. The spent electrolyte fluid passing from the electrode 18 relative to the workpiece 36 collects in a container 38 and flows through a conduit 40 back to the fluid container 10. A voltage source 39 is connected between the electrode 18 and the workpiece 36, such that the workpiece becomes the anode and the electrode becomes the cathode.

In FIG. 2 there is provided a curve 50 illustrating the discovered substantially linear relationship between the orifice gap or spacing and the orifice fluid pressure in terms of predetermined voltage conditions, with the curve 50 being shown for 10 volts. Thusly, the actual orifice fluid pressure can be compared with a reference or set point pressure as a means of providing a desired orifice gap to realize an end process guaging of the workpiece surface as it is being cut or shaped to provide an adaptive error signal for controlling either one or both of the electrode feed rate and the electrolyte flow to maintain this desired orifice gap or spacing. There is no change in the shape of the electrode 18 while electrochemical machining of the workpiece 36 takes place, so that a substantially constant orifice gap or spacing can be maintained in this manner throughout the entire machining of a given workpiece.

In FIG. 3 there is shown a curve illustrating the relationship that was determined to exists between the feed rate of the electrode 18 relative to the workpiece 36 and the orifice gap at a voltage of 10 volts.

In FIG. 4 there is shown a typical electrode 100 that has cut into a workpiece 102, with an orifice gap width substantially equal to $$\frac{Y-X}{2}$$

and an orifice gap length substantially equal to the mean path from entry A to exit B, assuming a linear gap throughout its length.

In FIG. 5 there is shown a modification of the present invention, including a current density sensing signal. The control system components corresponding to those already shown in FIG. 1 are shown with the same identifying numerals. In addition a current sensing device 51 senses the orifice gap current and provides an actual current density signal in conjunction with a predetermined orifice area signal from signal device 52. This actual current density signal is supplied to a current density control 54 for comparison with a reference to set point current density signal from the signal device 55, such that a suitable error signal is supplied to modify the electrode feed rate through operation of the feed rate control. It is within the scope of the present invention to modify electrolyte flow rate instead of electrode feed rate or to modify both of the latter variables as a function of current density error signal in this manner, if desired.

The electrolyte clarifier tank 11 shown in FIG. 5 can be in accordance with the disclosure in my copending patent application Ser. No. 396,912, filed Sept. 16, 1964, now Patent No. 3,306,456 and assigned to the same assignee.

In the operation of the control apparatus shown in FIG. 1 of the drawing, a predetermined and desired orifice pressure set point signal is provided by the signal device 24 for the flow valve control 22 and by the signal device 29 operative with the feed rate control 28 to in effect provide operating reference or set points for the operation of those respective control devices.

Initially the actual orifice fluid pressure is lower than the set point pressure, since the workpiece 36 is away from the electrode 18. Thusly, the initial actual orifice pressure is less than the reference pressure such that an error signal is provided initially by the feed rate control 28. At first this is a relatively large error signal and is supplied to the feed motor 30 to speed up the motor 30 in an effort to decrease the space or orifice gap between the electrode 18 and the workpiece 36. In a similiar manner the actual orifice pressure signal supplied by the transducer 26 to the valve control 22 is compared to the reference signal such that a relatively large error signal is provided initially to caues the bypass valve 20 to close in an effort to decrease the fluid bypass and thereby increase the electrolyte flow through the orifice and increase the orifice fluid pressure. As the space or orifice gap between the electrode 18 and the workpiece 36 decreases and approaches a predetermined working orifice gap, this results in an increase to the actual orifice fluid pressure as sensed by the pressure transducer 26 to cause the respective controls 22 and 28 to decrease their provided error signals. The feed motor 30 is now slowed in its operation and in practice slows down and can even stop for a moment as the electrode 18 reaches the desired orifice gap position for optimum cutting or removing the workpiece material, and then the feed motor 30 assumes a feed rate appropriate to the particular current density, electrolyte temperature, orifice pressure and the selected electrode voltage. The flow valve control 22 causes the bypass valve 20 to open and increase the fluid bypass as the transducer 26 senses the desired orifice fluid pressure, and thereafter regulates the opening of the bypass valve 20 to provide the required electrolyte flow control to maintain the desired orifice fluid pressure. Once an equilibrium condition is attained, the valve opening provided by the bypass valve 20 can and does in actual practice remain substantially constant, and the operation of the feed motor 30 as determined by the feed rate control 28 is so regulated that the actual orifice fluid pressure is substantially held constant at the reference or desired orifice fluid pressure.

The valve control 22 shown in FIG. 1 provides a continuous comparison between the actual orifice fluid pressure as sensed by the transducer 26, which is located as close to the orifice as practicable and reflects thereby the actual orifice pressure, and a reference fluid pressure as provided by the signal device 24 to cause the opening operation of the bypass valve 20 to be regulated such that a desired electrolyte flow rate is provided relative to the orifice fluid pressure. Similarly, the feed rate control 28 is operative to provide a continuous comparison of the actual orifice fluid pressure as sensed by the transducer 26 with a desired or reference fluid pressure for generating an error signal, which is supplied to the feed motor 30 for optimizing the electrode feed rate or advancement speed to maintain this desired or reference orifice fluid pressure through control of the spacing between the electrode 18 and the surface of the workpiece 36.

The thereby realized operation is essentially a sensing of the workpiece surface and the attendant orifice gap continuously as the workpiece is being cut and an adaptive changing of a least one of the electrode feed and the electrolyte flow parameters to maintain a desired orifice gap and workpiece surface shape. In this operation the electrode is operative as the conventional plug of a fluid guage, with the orifice gap or spacing between the electrode and the workpiece being operative as the sensing orifice as reflected through orifice pressure. The teachings of the present invention provide a closed loop continuous monitoring of the orifice pressure and substantially improve the technique of electrolytic workpiece machining, and take the operation out of the realm of human operator capability and prior art trial and error techniques by providing an adaptive control for the electrolytic workpiece machining operation.

The prior art capability of electrolytic workpiece machining is limited to tolerance expectations of plus or minus .002 inch. The teachings of the present invention, using presently available pressure transducers 26 and available and reasonable response times for the controls 22 and 28, effect a corrected gap variation which has in actual practice and can be expected to attain an accuracy of plus or minus .0001 inch.

The required workpiece part geometry and electrode area, power supply capacity, and production requirements will influence the initial assumption of a desired gap value. If small internal radii are required, a minimum gap value is desired. If power supply is limited, feed rate will be selected at less than otherwise realized maximum. Based on the above assumptions, approximate voltage and feed rate can be predetermined with the quantity or volume of electrolyte flow being appropriate by adaptive control of the pumping system. The control system depends on monitoring the fluid pressure at the orifice or as close to the orifice as practical. By establishing a pressure transducer set point at the desired orifice gap value equivalent of orifice pressure, a control error signal is generated to determine the operation of the electrolyte bypass valve 20 and to determine the speed of operation of the electrode feed drive motor 30.

The feed rate adjustment is in effect an inverse function or orifice gap, and there will always be some value of feed rate which will satisfy the pressure requirement if the electrode geometry is aprpopriate and a wide feed rate adjustment capability is available. By selecting and making the orifice pressure parameter fixed as desired at any given instant of operation, realizing that a plurality of different pressure steps can be programmed in advance, in accordance with the present invention, and by causing the electrode feed rate and electrolyte flow to automatically adjust until the reference or set point orifice pressure is attained, an operator can initiate and practice the process without continual operator attention and with a high degree of reliability of the resulting workpiece dimension. The ability to use only this orifice pressure parameter applies upon the realization that this orifice pressure is determined by and is linear relative to the desired orifice gap between the workpiece and the electrode.

In those relatively few cases where the electrode shape or the resulting electrode to workpiece gap do not meet this qualification of remaining substantially constant throughout the desired machining operation, it is proposed that orifice current density be used as an additional process controlling parameter provided that some reasonable means or temperature control device 61 such as a heat exchanger be provided to maintain substantially the same electrolyte temperature throughout a given process operation as shown in FIG. 5. In the latter instance a predetermined orifice current density defined as current per orifice area would be set in a current density control 54 and the actual orifice current density in terms of the actual orifice current sensed by current device 51 as a function of an orifice area signal obtained by the predetermined effective conducting area of the electrode relative to the orifice gap. This current density, which results from the ratio of total current as a function of total orifice area provided by signal device 52, would be compared with a set point value of orifice current density and the resultant current density error signal having both polarity and magnitude would be fed to the feed rate control 28 for controlling the electrode feed rate. Automatic flow conrol can, if desired, be additionally and simultaneously programmed by using this same orifice current density error singal for controlling the electrolyte flow bypass or pressure reducing operation of bypass valve 20.

Through the control function of the present invention, an orifice pressure transducer senses the orifice pressure relative to the electrode 18 and puts out an actual orifice pressure signal for comparison with a predetermined or reference orifice pressure signal to provide an orifice pressure error signal to accomplish two controller functions, one being the nulling function for orifice gap determining electrode feed rate and the other being the nulling function for orifice electrolyte flow control. The feed rate control 28 compares the magnitude and polarity of the actual orifice pressure signal with a reference value or set point and drives the feed regulating system motor 30 at a rate proportional to the error signal magnitude and in the direction determined by error signal polarity to reduce the resulting orifice pressure error signal to zero. The flow control 22 performs the similar function with regard to orifice electrolyte flow control.

One known prior art teaching discloses that a servomotor is employed to drive the feed rate of an electrochemical turbine blade forming electrode by sensing a control voltage proportional to the gap current in the process, but does not go into the details of the control function by this control voltage other than to say that the operation cycle is started wherein a two speed servo-motor initially drives the cathode electrode forward at a fast approach of about 0.5 inch per second until workpiece dissolving or errosion starts and the servo motor is then switched to slow feed of about 0.05 inch per second under closed feedback loop operation until the desired cut depth is reached, when the electrode head retracts rapidly. Such a two speed servo-motor operation is substantially different in effect as compared to the present invention, wherein the feed motor runs at a very high speed during rapid travel and then smoothly but very quickly deceelrates the electrode drive to a feed rate consistent with an optimized process. This prior art teaching further reveals no means for automatically controlling the electrolyte flow in conjunction with the completely optimized system.

It is also taught in the prior art when machining surfaces of essentially constant areas using a constant voltage source, that the electrolyte current flowing is a measure of the gap between the tool and the workpiece. As shown in FIG. 6 this process parameter is difficult to employ in this manner in view of the electrolyte temperature influence here and the difficulty involved in efforts to closely hold this electrolyte temperature to any given value in actual practice. In actual operations made with the adaptive control of the present invention disclosed herein it has been recognized that at any given pressure the system can be in equilibrium over a wide or relatively wide flow range which causes the process to proceed at variable efficiency.

It has been taught in the prior art that once the penetration of the electrode into the work has been well established, the rate of feed should be gradually increased until an arc is observed. Usually this arc will be of short duration, and the speed is then adjusted downwardly until the current sensing ammeter shows a current reading a little below the critical point at which the arc occurred. An important advantage realized by making unnecessary this prior art trial and error approach is to avoid the damage done to the electrode in view of the arcing that is required to fulfill this instruction; also, if the setting of the flow rate for the next time the operation is started is at a different flow opening, different process results can be expected. The present invention technique recognizes that electrode feed rate and electrolyte flow must both be accommodated for optimization of the desired machining operation.

It is also known to the prior art to utilize a control signal from pressure responsive transducers arranged to respond to the pressure differential across an electrolyte flow restriction placed in the fluid conduit between the pump and the electrode for controlling only the electrode feed rate.

The present invention teaches that the combination of electrolyte flow and electrode feed rate obtained maximizes the efficiency of the process, and the higher the electrolyte pressure, the higher the speed of the adaptive process and the smaller the orifice gap. The electrolyte pressure in the orifice gap should be held substantially constant and the feed rate response should be such that in combination with flow control the desired dynamic process proceeds. There can be maintained in this manner an extremely small work gap, while at the same time avoiding any possibility of arcing between the electrode and the work other than that caused by the passage of foreign particles that should be removed by provided filter devices.

There is at least one specific point at which the orifice gap, orifice pressure, feed rate, and flow characteristics will be operative in an equilibrium condition. The best known prior art workpiece cut had a taper in the resulting trepan hole of approximately .010 inch per inch of penetration. The present invention technique can yield a cut providing that either the outside surface of the hole or the inside trepan slug as desired can be held to a taper of less than .0005 inch per inch of penetration but that the other surface in turn will tend to have greater variation since this portion of the process is an erratic flow dominated area. At a given and predetermined orifice pressure, by varying the bypass flow valve position of the electrolyte system there will result varying cutting efficiencies. Not only will the efficiency of cutting vary but the ability to sustain the process can well be jeopardized. It is necessary to have an appropriate amount of electrolyte flow uniformly sustained in the orifice gap, and it is only necessary to supply that minimum electrolyte pressure head to the side of the electrode or at the ingoing side of the electrolyte passage leading to the orifice, to cause the electrolyte to fill the orifice gap and to flow at a rate which will sustain the desired electrolytic machining process. Additional pressure per se does not result in smoother finishes and the accuracy of work finish is not enhanced by higher pressures, since the accuracy of a lower minimum pressure cut can be just as good as that of a higher pressure cut, except perhaps for the somewhat limited ability to define a sharp internal radius. The sharpest internal radius that can be formed at any pressure is equal and proportional to the average gap of the process at that pressure. High accuracy of machined workpiece surface can be obtained without higher than minimum pressure. Even with the use of the inexpensive, harmless saline or NaCl solutions, problems of passivation are avoided when following the present disclosure which optimizes the flow parameter at the same time that the feed rate parameter is optimized. The present adaptive control process can result in accuracies 10 times greater or one whole magnitude greater than any known prior art teaching. The only accuracy increase due to pressure per se is obtained on internal radii that are made by subcorners. In other words the presently known electrochemical machining process is not solely an electrolyte pressure process.

The back pressure of the electrolyte discharging from the orifice can have significance on the resulting workpiece surface finish, but the pressure of the electrolyte as it is pumped to the electrode and the orifice gap does not per se determine the surface finish.

The present adaptive control is based upon sensing the orifice gap pressure created by the electrolyte being dammed up in an orifice defined by the gap or space between the electrode and the workpiece. When the ram containing the electrode is initially advanced towards the work at a rapid traverse speed, since no pressure exists at this time or little pressure exists in the flow line because the electrode is far away from the work, the motor operated flow control valve tends to close the bypass in order to deliver a maximum amount of electrolyte to the electrode and orifice thereby attempting to raise the pressure of the system. When the electrode approaches the workpiece, the orifice pressure starts to build up. The feed motor controller is an anticipatory controller and is responsive to this build-up or raising of the orifice pressure and gradually diminishes the speed of the ram as the pressure approaches a reference or set point value, and the ram speed is slowed down approaching the eventual feed speed; the motor operated flow control valve is opened as required to provent the orifice pressure from building up beyond the reference or set point value. The simultaneous adaptation to the process requirements of electrode feed speed and electrolyte flow control occur very rapidly. The speed at which they occur is a function of the rapid traverse speed. It is expected that the electrode will approach the work at a rapid traverse speed of approximately 20 inches per minute and will slow down to a feed speed of some .05 to .1 inch per minute in less than one second. This capability has several advantages: firstly, it eliminates the need for setting speed change microswitches as required in basic two feed rate speed systems and secondly it causes the work to commence at a finite point as if it had been cutting the workpiece all of the time. When an electrode is started beyond the appropriate gap distance as usually occurs in the prior art available equipment, bell-mouthing occurs at the entry of the hole because the electrolyte has been working on the top surface of the hole for sometime before the electrode actually entered the workpiece.

A user of the adaptive control in accordance with the present invention should consider some basic procedures in determining operating parameters. Firstly, use the highest voltage available in the equipment compatible with the particular power supply, since the higher the voltage there results in greater speed of operation for any given orifice pressure. The only known limitation to voltage magnitude is the fact that more current is drawn by higher voltage and there is a practical limit of the current capacity of the particular power supply. For instance if the particular power supply has a capacity of 16 volts and three thousand amperes, and a three square inch conductive electrode cutting surface is employed, the practical machining operation is limited thereby to a current density of one thousand amperes per square inch. By reducing the voltage from 16 volts to 8 volts, twice the area of electrode could be used at half of the feed rate. A similar result can be obtained by changing the pressure set point on the adaptive control. It is recommended that the maximum voltage of the power supply be used since the open circuit voltage of a power supply is generally about twice that of the maximum operating voltage of such a power supply, and any reduction in voltage below that maximum results in power factor losses which use up purchased electrical energy without resulting in productive work.

Secondly, the pressure required to provide a consistent electrolytic film between the electrode and the workpiece is a function of the length of the path that the electrolyte has to travel from the high pressure side of the orifice to the low pressure side of the orifice, measured across the restricted gap and multiplied by the actual gap width. The perimeter of the cut is not determinative of the pressure required for the process, but this perimeter of cut is determinative of flow or the quantity of electrolyte in gallons per minute. Empirical data can be readily developed to provide the practitioner with the set point or reference orifice pressure parameter, if he determines the area of his electrode as well as the length of the conducting path of the electrolyte and the gap width. However, in view of the difficulty in establishing these exact area parameters on a three dimensional electrode, and in view of the linear relationship prevailing, a very simple electrode calibration method would be recommended wherein the practitioner would take two trial cuts with a given electrode in the material which he intends to use, with each of these cuts being taken at different pressures. A first such cut is taken at about 75 pounds per square inch and the second such cut is taken at about 200 pounds per square inch orifice pressures; by measuring the overcut at these two pressures and then placing this information on a simple rectangular coordinant graph, it is easy to determine the intermediate pressure point along this straight line which will give the orifice gap size necessary to meet the part drawing. It is expected after further work experience for a given operator than that possibly only one trial cut at the latter intermediate point could establish the curve or straight line for that electrode to program the subsequent performance of same. The reason we are able to teach the practitioner by this method is established by the art and science of "air guaging." In practice the process control in accordance with the present invention utilizes the same principles that the air guaging science already uses for accurately measuring workpiece parts off-line as they come from conventional machining processes. However, in this case, we are on-line using the electrolyte as the fluid in the guage rather than air. But the similar guaging principle that operates for prior art air guaging technology relates directly to the liquid fluid guaging of the present invention and thereby provides closed loop continuously adaptive control of the electrochemical machining process.

Thirdly, the insulated portion of the electrode should be a significant step behind the conducting surface, such that the electrolyte flow path between the cutting surface and the insulating surface would not add significantly to the resistance of electrolyte flow when making deep cuts in particular.

It should be realized that the flow parameter can satisfy the null point or orifice pressure set point requirement at a proper feed rate as well as the feed rate can satisfy the same desired equilibrium at a proper flow rate. It is suggested that the technique of operating the flow valve should be such that it cooperates with the feed rate control at a point close to the equilibrium point. This does not mean the flow valve control has to reach the equilibrium point before it adaptively reaches its appropriate level but it has to be within reach of it in order for the simultaneous achievement of a null point condition in both controllers. The simple fact that there are two interdependent set points to match is a determining factor. A signal null meter connected between the output of the two involved controls could be utilized to show that both of the effective control settings are about equal and that both the resulting error signals are about equal to substantially approach a zero null meter reading or to indicate a desired and preprogrammed difference. When these null points are equal, a tendency to drift through increased flow or decreased feed rate occurs. This can be overcome by (a) amplifying the feed rate signal or (b) biasing the set point of the feed rate controller so it is seeking a higher pressure point than the flow controller to in effect make the flow controller subservient to the feed rate controller, but well within the process continuity and subject to good repeatability. It should be realized that the output from each of the feed rate control and the flow valve control is an error correction signal, and the feed rate error correction signal should come close to matching the flow rate error correction signal at a process equilibrium condition.

Every material has one penetration rate for a given current density; in other words, it will be deplatable by this electrochemical operation at only one speed for a given current density regardless of the size of the area of the electrode. When operating at a current density of 1000 amperes per square inch, which is determined by the feed rate because the orifice gap varies with the feed rate, as an equilibrium and stable condition is reached so that the current density is 1000 amperes per square inch at the operating temperature and voltage, the orifice gap has a predeterminable opening. As the electrolyte heats up, the feed rate must effectively increase to maintain the same resistivity to therefore maintain the same current over the constant area. With the prior art teachings including a constant feed, as the electrolyte heats up there is cut a bigger hole because the electrolyte resistivity has decreased and the current density goes up to remove more workpiece material. In accordance with the present invention, including a truly adaptive control and sensing of the orifice size, the orifice size remains the same throughout the whole operation but the feed rate or speed is changed as required. The orifice pressure is a function of the orifice gap and if the orifice gap size is the same throughout the whole operation, the orifice pressure is the same. To show this in actual practice, the feed rate is synonymous with gap, and the voltage, temperature, and electrolyte concentration are a function of the insulating gap. A constant feed rate can be provided and vary flow or a constant flow can be provided and vary feed rate to give a family of curves. A particular orifice pressure should be selected such as 100 p.s.i. to give a cutting rate of .1 inch per minute in steel as a reference with about 1000 amperes per square inch; on the other hand, at an orifice pressure of 200 p.s.i. the cutting rate would be .2 inch or better with a current density of 2000 amperes per square inch. An orifice pressure of 300 pounds would give a cutting rate of about .3 inch in steel. One limitation on the practical upper limit for the theoretical cutting rate is that the orifice gap gets rather small for a larger cutting rate and the attendant possibility of nuisance failure caused by a particle of dirt or the like getting caught by a small gap makes the risk higher than the electrochemical machining operation will not get all the way through a desired particular cut without a fault. An analogy can be made here to prior art mechanical machining where if a cutting tool is run very fast, a lot of material will be removed, but the danger of chipping, and damaging the workpiece or the tool is increased. There is an economic point from which an operator has to back off from the best he can possibly do, because he knows that at the end of eight hours he will have more satisfactory workpieces with less down time, less tool upkeep, less part damage if he holds down the running rate a bit.

Orifice pressure is initially zero and slowly builds up to some predetermined set point, such as 100 p.s.i., as the electrode enters the workpiece cut. After the orifice pressure reaches the set point, it remains substantially constant throughout the rest of the workpiece cut. As the orifice pressure builds up, the electrolyte flow comes down from an initial maximum to some lesser value. The flow might not come down linearly, but once the orifice pressure reaches the set point value, an equilibrium occurs and the electrolyte flow is provided such that the orifice pressure holds at that value. As the orifice pressure rises to 100 pounds per square inch, the flow might very well reduce from 25 gallons a minute to in the order of 4 gallons a minute or 2 gallons a minute at the equilibrium point, and the feed rate is regulated in agreement with the latter flow rate into such that there occurs into the workpiece cut a consistent advancement of the electrode that is compatible with the equilibrium flow and orifice pressure. The whole electrochemical machining operation equilibrium is maintained by the fact that the transducer 26 that is measuring the orifice pressure reflects any change in that orifice pressure to both the feed rate control 28 and the flow valve control 22 causing them to null out any error signal jointly as the orifice pressure error condition occurs.

Once there is obtained a stabilized flow at its natural and necessary rate compatible with the set point orifice pressure and the natural and necessary feed rate, it can be advantageous to lock at that setting the flow valve control 22 and thereby hold the valve 29 setting for flow so that the control system is not affected by two floating control parameters and instead the flow valve setting will sustain the process and the feed rate setting will be adjusted as necessary to effect the desired orifice pressure equilibrium at that fixed flow valve position. This simplifies the control operation because there are not two regulating controls operating simultaneously. When there is only one control operation, there is less likelihood of one disturbing the other. In theory, if the feed rate were fast enough to dominate the whole operation, the flow rate would be inherently controlled and stabilized before the feed rate stabilized. However, presently available machines on the open market are not capable of an unlimited feed rate; they are not designed to go faster than about 1 inch a minute and the machine in usual practice will only go 0.84.

In reference to prior art available accuracy of cutting, for a 2½ inch cut in length there was shown a .023 inch taper from the start of the cut to the finish of the cut, which is roughly .010 of an inch taper per inch of travel. In cuts made with the present invention adaptively, with depth of cut approximately one inch, a taper of less than .0005 inch in one case and in another case there was a taper of .00075 inch per inch of travel.

The ability to control the flow and to set the flow rate and feed rate and the orifice pressure without trial and error is difficult with prior art teachings. After the selection of the reference orifice pressure at some value such as 100 p.s.i., then with the present invention the flow rate and the feed rate are adaptively controlled, with the electrolyte temperature being ignored as well as the concentration of the electrolyte, although the clarifier keeps the hydroxides from building up in the electrolyte beyond 60% by volume. In this manner the improved clarifier 11 shown in FIGURE 5 allows a longer time for the operation with a given electrolyte batch before it becomes necessary to shutdown. Another thing of concern with the electrolyte is the fact that as a great deal of work cutting is being done, the heat input to the electrolyte tank due to the resistive power drop in the electrolyte in the orifice gap causes an undesired heat transfer from these power drop losses to the liquid raising the temperature of the liquid. It is unwise to attempt to run the electrolyte at a temperature close to that which would cause formation of gases to, in turn, delete the operation. Thusly, it can be advisable to have a heat exchanger in the system as shown in FIGURE 5 which will take this heat out only in the sense that it need take it out to prevent it from getting above a certain temperature and not necessarily hold it to a close tolerance in temperature or to a predetermined temperature. For instance, if the heat exchanger is set for 125° F. and it should happen to drift to 130° F., this is no problem as long as it tended to hold the electrolyte temperature down below the gasing temperature of around 140° F. The curve shown in FIG. 6 illustrates the importance of electrolyte temperature.

The orifice gap created by the electrode is significant for the selection of operating parameters and affects the logical selection of the orifice pressure at which it is desired to operate and to cut aside from the cutting speed which is enhanced by higher pressure adaptively. This resistance to flow through an electrolyte orifice is a function of the length of the gap and the width of the gap. In other words, if the width of gap is about .005 inch, which is a typical distance between the face of the electrode and the face of the work to be cut, and electrolyte liquid going either in or out of this interface orifice has to traverse ⅛ of an inch path length. This, in essence, defines the pressure or head which is necessary for solid flow during cutting and providing no voids in the orifice gap. However, the electrode determines the area of this gap, which has just been described as .005 inch by ⅛ inch; if there is a one inch diameter circle of this exposed conductor, the perimeter length will be 3.1416 inches. This length of the conductor surface dictates the flow in that one inch electrode with a width and gap the same as two inch electrode with the same width and gap but having twice the perimeter of the cut, it would take one-half the flow for the one inch electrode at the same pressure to satisfy the electrolyte cutting requirements.

Flow should not be chosen as the process set point determining parameter because actual experimentation has shown with the adaptive control apparatus shown in FIGURE 1, when the feed rate was regulated to maintain 100 pounds per square inch of orifice pressure, the flow rate was varied in this experiment from below 2 gallons per minute to above a 3½ gallons per minutes flow rate, with the response of this system constantly maintaining 100 pounds per square inch as prescribed by the feed rate controller involved; both the feed rate and orifice current utilized increased as flow increased in relationship as follows: the feed rate increased from .1 inch per minute to .16 inch per minute and the current had a similar increase from 200 amperes to 320 amperes, with a proportional increase of current drawn to the increase in feed rate that was a result of changing flow. Below a flow rate of 2 gallons per minute and above a flow rate of 3½ gallons per minute, the process operation was not sustained. Therefore, if a particular flow rate were selected, a pressure balance could be realized with that given flow rate which would not necessarily be an optimum or fixed parameter. For this reason it would be difficult to know at what flow rate to set the controller to adaptively optimize the cutting process. The cutting process should reach an optimum equilibrium without having a multiple choice of flow rates, and the above described experiment showed that at a given pressure, the cutting process could proceed at a number of flow rates.

It is no problem to know which orifice pressure to select, since it is better to select one parameter and let all of the other parameters suit themselves to the logical choice of that one parameter. Now in the prior art, there are teachings of controlling the process as a function of current density, and current density is not a reliable controlling parameter because it varies as a factor of electrolyte temperature.

One suggested simplification of the present invention is to initially control flow and then hold it as previously described and thereafter control feed rate only for a particular workpiece cut which would simplify the actual cutting process control apparatus that you have to build and sell as a product. Once a given piece of apparatus was temporarily used to perform its function of arriving at the correct flow, it could then be taken out of the circuit so that the system would not be susceptible to unbalancing by the interrelation of the two regulating systems for flow and feed rate respectively. This would be a way of providing a universally applicable ECM machine. If such an electromechanical machine were to be supplied to a turbine manufacturer who wants to make thousands of similar turbine blades, it might be feasible if he only operates adaptively a feed rate controller as a function of orifice pressure, and in addition provides a simple ramp function generator or the like that controls flow rate in accordance with some known initial time period to repeat an earlier actual performance and then the flow valve control in effect saturates and is not really an adaptive closed loop control. Since it is desired to mass produce turbine blades, all identical, there would be practically no need to provide a more capable control in relation to flow rate.

The present concept of orifice pressure control was the result of numerous experiments with a family of electrodes, including a typical experiment in which data was reported as to the orifice current, pressure, gap or overcut of the workpiece, voltage and temperature in isolated independent cuts which were designed to determine parameter limitations for cutting when employing a tapered electrode going into an already drilled hole for precision boring. In the gap opening range which is normally used for machining, the straightness of the relationship between orifice pressure and orifice gap suggested that if the orifice pressure was known, the orifice gap could be determined and they would vary uniformly such that if the orifice pressure changed, the orifice gap would change a like and predictable amount. The workpiece cut is known to be a function of orifice gap because the electrode does not change in size during the process operation since it does not enter into the deplating or plating part of the process operation and does not have a chance to grow; therefore the only part of the system that changes in size and shape is the workpiece which is deplated. Since the cathodic electrode does not change in size, the workpiece will be a consistent desired size if the orifice gap does not change. The orifice gap is determined to be truly a function of two dependent variables, orifice current density and orifice pressure. However, both orifice current density and orifice pressure are dependent on voltage, feed rate, and electrolyte flow so the orifice pressure parameter was used as a measure of the orifice gap with a transducer being provided to put out an actual signal as to what the orifice pressure is and then subsequently compare this signal with a set point or reference signal to provide an error signal to be the output of the controller, which would be proportional in operation and drive the independent variable variables, electrolyte flow and electrode feed, in the direction necessary to null out the orifice pressure error signal. If the voltage of the dynamic system is varied while in equilibrium, the feed rate will approximately move in a direction to accommodate the change in voltage to maintain the orifice pressure signal as scheduled. This shows that voltage control on the power supply is not needed if adaptive feed rate is provided, and permits the use of a less expensive supply. It was observed in actual practice that in order to control the machined cut of the workpiece to .0002 of an inch, there was required less than .01 inch per minute variation in the feed rate, meaning the linearity or the accuracy of the feed rate. The wokpiece cutting or removal rate varies directly with orifice current density. There are many other process operation variables such as current, electrolyte concentration, electrolyte temperature, age of electrolyte, orifice gap, electrolyte flow. The age of an electrolyte involves such things as pH which affect solubility and cutting to some extent which has not been well stated in the literature. The present adaptive control compensates for the electrolyte age, because the speed of the adaptive control feed mechanism adjusts to the specific cutting rate available to the cutting process, with whatever the electrolyte conditions are. A high taper accuracy can be obtained at any practical orifice pressure and approximately the same surface finish can be obtained at any practical orifice pressure. The size of the cutting gap across the entire work surface is in effect monitored throughout the machining cycle in accordance with the present invention to give an all inclusive measure of cutting process performance.

In the practical operation of the present control apparatus at a given orifice gap voltage such as 10 volts and for a given workpiece material such as 304 Stainless Steel, the current drawn is a function of the gap width and the electrolyte conductivity. One requirement to sustain an equilibrium or steady-state substantially uniform deplating operation, with the feed ram being controlled at a constant speed of 0.1 inch/min., is to have a solid film of electrolyte flowing in the gap at a rate which will carry the generated heat of the reaction away from the liquid in the gap so the latter will not boil. Also, the solid film of flowing electrolyte removes a sufficient volume of hydroxide to keep the liquid electrolyte a reasonably good current conductor. It should be well known that this hydroxide is the product of the deplating process, wherein the water ($H_2O$) in which the salt (NaCl) has been dissolved, is broken up into H and OH by electrolysis, and then the H becomes $H_2$ as free hydrogen that has to be carried away by forced ventilation for safety purposes and the OH marries the metal ion to form one of ferrous hydroxide or ferric hydroxide. It is important that too large a flow rate of the electrolyte be avoided, since otherwise passivation occurs to slow the deplating rate as widened by a dropping-off of the sensed current to cause the electrode to "catch-up" with the workpiece material and effect an undesired spark.

The gap pressure is a physical relationship with the electrolyte flow in hydraulic systems. This does not vary too greatly as a function of electrolyte temperature for the range of the latter encountered in the present process operation, since the variation of the electrolyte density at this range of temperatures is not significant. However, the use of gap current, gap current density or the gap voltage as the sensed process variable for process feedback control purposes is less desirable in that these variables all vary in much greater significance as a function of electrolyte temperature.

An adequate electrolyte fluid pressure head is required for the process of the present invention before the gap or orifice restriction such that a continuous film of electrolyte will flow through the gap as previously mentioned. The width of the gap and its length determine the fluid pressure drop or flow resistance to define the pressure head required. The perimeter of the gap defines the flow quantity for the gap at any particular pressure. As shown in FIGURE 4, if the electrolyte fluid is introduced from the inside of a hollow and cylindrical electrode and caused by the workpiece to flow through the gap and out of the resulting outer ring, a laminar flow pattern will exist at A and turbulent flow may exist at B, for normal gaps greater than 0.004 inch and a gap pressure such as 150–200 p.s.i. Consequently, the same quantity of fluid which has adequately filled the inner gap portion A now may be inadequate to fill the outer gap portion at B to allow the electrolyte fluid to flow in undesired streams and causing a phenomenon called striations to occur. These are shown by the flow patterns of the conductive electrolyte in deplating the workpiece area adjacent the gap portion at B. If the workpiece area adjacent the gap portion at B as shown in FIGURE 4 is the more important, the electrolyte fluid can be introduced into the gap from outside the electrode and removed from the inside of the electrode to improve the deplating process relative to the more important workpiece area.

A rough estimate of process capability in accordance with the present invention is summarized as follows in reference to the curve shown in FIG. 3 for a given electrode. At 10 volts, a change of 1 volt changes the orifice gap by 0.001 inch. At 10 volts a change 0.1 volt changes the gap by 0.0001 inch. At 10 volts a change of 0.1 inch per minute changes the gap by 0.002 inch. At 10 volts a change of 0.01 inch per minute changes the gap by 0.0002 inch. If orifice pressure fluctuations are kept within a one pound per square inch range, the orifice gap can be maintained with an accuracy of 0.0001 inch range. Even if orifice pressure fluctuations are as much as 4 percent, or 12 pounds per square inch at 300 pounds per square inch or 8 pounds per square inch at 200 pounds per square inch, an orifice gap variation of about 0.001 inch can be expected without correction.

The term orifice pressure has been used throughout this specification to simplify the description, but is intended to cover the effective cutting or machining process pressure that is very difficult to actually measure. Therefore, the inlet pressure to the electrode has been used and described as substantially the equivalent of orifice pressure, and this is adequate where the electrolyte discharge from the orifice gap is open to the atmosphere. On the other hand, where the effective discharge pressure is controlled to give a process back pressure, the orifice pressure is determined by subtracting the measured lower discharge pressure from the measured higher inlet or electrode supplied pressure to yield the orifice pressure drop or the orifice pressure. This same relationship is true when the electrolyte is supplied to the process orifice through the workpiece or by some other suitable means such as a rotating electrode to effect an electrolyte pumping or pressurizing action.

Current density is determined and sensed by measuring the electrode current with an ammeter and then dividing that current value by a predetermined effective electrode area.

For an electrode having a bottom face and/or side wall portions that cut, as determined by selective insulation of the bottom face and wall portion, it initially will not provide as restrictive an orifice as will finally be provided at cutting process equilibrium. However, the above defined current density controlling parameter will be effective for this purpose since the here provided control system is adaptive. More specifically, when a lesser electrode area is effectively carrying cutting orifice current relative to the workpiece, a proportionately lesser current will be drawn to maintain the reference current density throughout the cutting operation after the cutting current begins to flow. As the electrode cuts into the workpiece and the effective electrode area proportionately increases, there will result in a proportionate increase in the electrode current flow to maintain the zero correction or error signals from the signal comparison circuits for the respective feed rate controller and the electrolyte flow controller.

The clarifier tank 11 shown in FIGURE 5 has proved to be very desirable in the practical operation of the present invention. Without such a clarifier, a typical user of this deplating process, having a 300 gallon tank of salt water concentrated to a ratio of between 1 and 2 pounds of salt per gallon of water, could remove only about 50 cubic inches of iron metal before the user would have to dump and throw away the whole tank of salt water to avoid undesired effects on the workpiece deplating. The clarifier 11 allows the user to continuously operate by virtue of a continuous clarification of the salt water to remove the undesired hydroxides, with a substantially constant volume being maintained by periodic makeup with fresh electrolyte. A substantially improved process operation is realized in this manner.

The electrolyte concentration affects conductivity and the electrolyte temperature affects conductivity. If the concentration is higher than about a 10% solution of NaCl or salt or the temperature becomes higher than about an ambient of 80° F., the conductivity is greater and cutting proceeds more rapidly to effect a greater workpiece removal. Without adaptive control this becomes problematical for accuate workpiece shaping, since at the same voltage and the same electrode feed, a tapered cut will result. With adaptive control, for greater conductivity, the net change in conductivity is compensated for by control through increased electrode feed rate. For lesser conductivity there is required a slower feed.

One contemplated modified and more simple operation of the present control apparatus would be to predetermine the feed rate and the orifice pressure, and initiate the process operation while allowing the flow rate to adaptively reach an equilibrium condition. When this happens, the flow rate can now be held constant in value while simultaneously regulating the feed rate in accordance with orifice pressure as the control parameter is required to maintain the desired orifice pressure. This simplifies and provides a compromise correlation of the feed rate and the flow rate.

It should be realized that foreign bodies or particles contained in the flowing electrolyte can cause disturbances in the sensed orifice pressure which are then fed back as artificial changes in orifice pressure to cause the feed rate and flow rate regulating servo systems to undesirably institute changes in their respective controlled process variables. Mechanical filters can be added to the electrolyte flow path to remove most of these particles. In addition the servo regulators operative with each of the feed rate and the flow rate controls can be made to limit their response as a function of the rate of change of the feed back control signal to minimize undesired changes in the controlled process variables for this reason.

It will be apparent to those persons skilled in this art that the adaptive control technique of the present invention will yield a predetermined orifice gap which is a function of a particular orifice pressure, regardless of applied electrode voltage, electrolyte conductivity or any other known process variable; however, many changes and modifications can be made both in the apparatus and in the method above described without departing from the scope or spirit of the present invention.

I claim as my invention:

1. In the electrolytic process of removing material from a workpiece by means of an electrode having a conductive working face, the method comprising, impressing an electric current across said electrode and said workpiece predominantly anodic, pumping a liquid electrolyte to a provided gap between said working face and said workpiece, applying a force between the electrode and the workpiece in a direction to decrease said gap, sensing the pressure of said electrolyte relative to said gap to provide a first control signal in accordance with the actual pressure of said electrolyte relative to said gap, providing a second control signal in accordance with a desired pressure of said electrolyte relative to said gap, and controlling said force in accordance with the difference between the first control signal and the second control signal.

2. In the electrolytic process of removing material from a workpiece by means of an electrode having a conductive working face positioned adjacent to said workpiece, the method comprising, impressing an electric current across said electrode and said workpiece to make said workpiece predominantly anodic, pumping a liquid electrolyte through a passage within said electrode leading to a gap between said working face and said workpiece, applying a force between the electrode and the workpiece in a direction to move together said electrode and said workpiece, sensing the actual pressure of said electrolyte relative to at least one of said passage and said gap to provide a first control signal in accordance with said actual pressure, providing a second control signal in accordance with a desired pressure of said electrolyte relative to at least one of said passage and said gap, and controlling said force to reduce any difference between the first control signal and the second control signal.

3. In the electrolytic process of shaping a workpiece by means of an electrode having a conductive working face, the method comprising, impressing an electric current across said electrode and said workpiece to make said workpiece predominantly anodic, pumping a liquid electrolyte through a passage within said electrode for discharge into a gap between said working face and said workpiece, applying a force to one of said electrode and said workpiece to provide movement of said one in a direction toward the other of said electrode and said workpiece to control said gap, sensing the actual pressure of said liquid electrolyte relative to said gap to provide a first control signal in accordance with said actual pressure of the electrolyte relative to said gap, providing a second control signal in accordance with a desired pressure of said electrolyte relative to said gap, and controlling said force in accordance with a predetermined comparison between the first control signal and the second control signal.

4. In the electrolytic process of shaping a workpiece by means of an electrode having a passage therein and a conductive working face, the method comprising, impressing an electric current across said electrode and said workpiece to make said workpiece predominantly anodic, pumping a conductive liquid electrolyte through said passage in the electrode into a predetermined opening between said working face and said workpiece, applying a force to at least one of the electrode and the workpiece in a direction to control said opening, measuring a predetermined characteristic of said electrolyte relative to said opening to provide a first control signal in accordance with the actual value of said electrolyte characteristic relative to said opening, providing a second control signal in accordance with a desired value of said electrolyte characteristic relative to said opening, and varying at least one of said force and said pumping in accordance wtih a predetermined comparison of the first control signal and the second control signal.

5. In the electrolytic process of removing selected material from a workpiece by means of a movable electrode having a conductive working face, the method comprising, impressing an electric current across said electrode and said workpiece to make said workpiece predominantly anodic, passing a flow of liquid electrolyte through said electrode and into a predetermined gap between said working face and said workpiece as required to effect the desired removal of said material, controlling the rate of advancement between the electrode and the workpiece to provide a relative movement therebetween in a direction to determine said gap, sensing the pressure of said electrolyte relative to said gap to provide a first control signal in accordance with the actual pressure of said electrolyte relative to said gap, providing a second control signal in accordance with a predetermined reference pressure of said electrolyte relative to said gap, and varying at least one of said rate of advancement and said flow as required to minimize any difference between the first control signal and the second control signal.

6. In the electrolytic process of removing material from a workpiece by means of an electrode having a conductive working face, the method comprising, impressing an electric current across said electrode and said workpiece to make said workpiece predominantly anodic, pumping a flow of liquid electrolyte through said electrode and onto said workpiece across a gap between said working face and said workpiece, applying a force to at least the movable one of the electrode and the workpiece in a direction to maintain a desired gap, determining said desired gap in accordance with the resulting flow of electrolyte when the movable one of the electrode and the workpiece is varied in position and the electrolyte pressure is varied, sensing the actual pressure of said liquid electrolyte relative to said gap to provide a first control signal in accordance with the actual pressure of said electrolyte relative to said gap, providing a second control signal in accordance with a desired pressure of said electrolyte relative to said gap, and controlling said force and said flow of electrolyte as required decrease any difference existing between the first control signal and the second control signal.

7. In apparatus for the electrolytic machining of a workpiece, the combination of an electrode member movable in position relative to said workpiece to determine a gap therebetween, means for impressing an electric current across said electrode and said workpiece to make said workpiece predominantly anodic, an electrolyte fluid source operative to supply pressurized electrolyte fluid into a provided gap between said electrode member and said workpiece, electrolyte fluid pressure sensing means operative to provided a control signal in accordance with the pressure of the electrolyte fluid relative to said gap, and control means operative to control at least one of said gap and said pressure of the electrolyte fluid and being with said electrode member responsive to said control signal for controlling at least said one of said gap and said electrolyte fluid pressure as a predetermined function of said sensed gap pressure.

8. In apparatus for the electrolytic shaping of a workpiece, the combination of a hollow electrode member movable relative to the position of said workpiece, means for impressing an electric current across said electrode and said workpiece to make said workpiece predominantly anodic, a fluid electrolyte source operative to supply pressurized electrolyte fluid to a controlled gap defined by said electrode member and said workpiece, electrolyte fluid pressure sensing means operative to provide a control signal responsive to the pressure of the electrolyte fluid in said gap, first control means connected to said electrode member and responsive to said control signal for controlling the movement of the electrode member relative to the workpiece as a predetermined function of said electrolyte fluid pressure, and second control means connected to said electrolyte source and responsive to said control signal for controlling the pressure of the electrolyte fluid supplied to said gap as a predetermined function of said gap pressure.

9. In apparatus for the electrolytic shaping of a workpiece, the combination of an electrode member supported relative to said workpiece such that a controlled relative movement is provided, means for impressing an electric current across said electrode and said workpiece to make said workpiece predominantly anodic, an electrolyte fluid source for supplying pressurized electrolyte fluid into a provided gap between said electrode member and said workpiece, fluid pressure sensing means operative to provide a control signal in accordance with the pressure of the electrolytic fluid relative to said gap, first control means responsive to said control signal for controlling the movement of the electrode member relative to the workpiece to determine said gap as a predetermined function of said gap pressure, and second control means responsive to said control signal for controlling the supply pressure of the electrolyte fluid from said source as a predetermined function of said gap pressure.

10. In apparatus for the electrolytic shaping of a workpiece, the combination of an electrode member supported adjacent said workpiece, to permit a relative movement between said electrode and said workpiece, means for impressing an electric current across said electrode and said workpiece to make said workpiece predominantly anodic, a source of an electrolyte fluid for supplying electrolyte fluid into a defined gap between said electrode member and said workpiece, fluid pressure sensing means operative to provide a control signal as a function of the pressure of the electrolyte fluid in said gap, first control means operative with at least one of said workpiece and said electrode member and responsive to said control signal for controlling the relative movement between the electrode member and said workpiece as a predetermined function of said gap fluid pressure, and second control means operative with said electrolyte source and responsive to said control signal for controlling the supply pressure of the electrolyte fluid as a predetermined function of said sensed gap pressure.

References Cited

UNITED STATES PATENTS

| | | | |
|---|---|---|---|
| 3,002,907 | 10/1961 | Williams | 204—143 |
| 3,058,895 | 10/1962 | Williams | 204—143 |
| 3,121,054 | 2/1964 | Van Emden | 204—228 |
| 3,287,245 | 11/1966 | Williams | 204—143 |
| 3,336,215 | 8/1967 | Hagen | 204—266 |

FOREIGN PATENTS

| | | |
|---|---|---|
| 1,290,734 | 3/1962 | France. |
| 3,812,829 | 7/1963 | Japan. |

HOWARD S. WILLIAMS, *Primary Examiner.*

ROBERT K. MIHALEK, *Examiner.*